(12) United States Patent
Fattu et al.

(10) Patent No.: US 10,031,050 B2
(45) Date of Patent: Jul. 24, 2018

(54) UNIVERSAL MANUFACTURING TEST PLATFORM

(71) Applicant: International Business Machines Corporation, Armonk, NY (US)

(72) Inventors: Khajistha Fattu, Austin, TX (US); Michael Fattu, Austin, TX (US); Rachael C. Freitas, Austin, TX (US); George Zacharakis-Jutz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 15/293,037

(22) Filed: Oct. 13, 2016

(65) Prior Publication Data

US 2018/0106702 A1  Apr. 19, 2018

(51) Int. Cl.
| | | |
|---|---|---|
| G06F 19/00 | (2018.01) | |
| G01M 99/00 | (2011.01) | |
| G06F 11/22 | (2006.01) | |
| G06F 3/044 | (2006.01) | |
| H01R 27/02 | (2006.01) | |
| H01R 43/20 | (2006.01) | |

(52) U.S. Cl.
CPC .......... *G01M 99/008* (2013.01); *G06F 3/044* (2013.01); *G06F 11/2221* (2013.01); *H01R 27/02* (2013.01); *H01R 43/20* (2013.01)

(58) Field of Classification Search
CPC ............ G01M 99/008; G06F 11/2221; H01R 13/514; H01R 13/518; H01R 24/68; H01R 12/716; Y10S 439/941
USPC .......................................... 702/108, 121–123
See application file for complete search history.

(56) References Cited

U.S. PATENT DOCUMENTS

| | | |
|---|---|---|
| 5,793,648 A | 8/1998 | Nagle et al. |
| 6,564,112 B1 | 5/2003 | Factor |
| 7,000,460 B1 | 2/2006 | Cline et al. |
| 8,417,774 B2 | 4/2013 | Flynn et al. |
| 9,026,409 B2 | 5/2015 | Schmidtke et al. |
| 9,362,694 B2 * | 6/2016 | Flender ............... H01R 13/514 |
| 9,515,441 B2 * | 12/2016 | Fattu ..................... H01R 27/02 |
| 2005/0080502 A1 | 4/2005 | Chernyak et al. |

OTHER PUBLICATIONS

Prisching et al., "Configuring Complex Multi-Sensor Test Bed Systems." Proceedings of the Telecommunication and Mobile Computing-Workshop on Wearable Computing. 2003.

* cited by examiner

*Primary Examiner* — An Do
(74) *Attorney, Agent, or Firm* — Patterson + Sheridan, LLP (57) ABSTRACT

Embodiments herein describe a universal test platform that includes a universal test station (UTS) coupled to a system under test (SUT) using respective adapters. The adapters include an interface subdivided into portions that are assigned to different data and power standards. In one embodiment, the UTS is coupled to a UTS adapter using a plurality of cables that transmits the different data and power signals between the UTS and the adapter. For example, the interface in the UTS adapter may include a plurality of pins or optical channels that are each coupled to one of the plurality of cables. The SUT is coupled to a SUT adapter which may have the same interface as the UTS adapter. However, the SUT may be coupled to only a sub-portion of the I/O elements in the SUT adapter, and thus, only some of the I/O elements are used when testing the SUT.

20 Claims, 5 Drawing Sheets

UNIVERSAL MANUFACTURING TEST PLATFORM

BACKGROUND

The present invention relates to testing electronic devices, and more specifically, to a universal test platform for connecting to, and testing, different types of electronic devices.

Functional testing of an electronic device (e.g., a server, switch, router, etc.) is typically the last step in the manufacturing process to verify that the devices work as intended. Electronic devices typically have specific testing requirements that vary greatly from product to product. Often, dedicated floor space and infrastructure are required to test each individual product, as system requirements are unique. The hardware setup includes cables, connectors, power supplies, etc. which all may be unique to the testing of a specific type of electronic device. If hardware setups are unique, the setup used to test one electronic device cannot be used to test a different electronic device that requires a different hardware setup.

SUMMARY

One embodiment of the present disclosure is a test platform that includes a universal test station (UTS) comprising a test controller configured to select one of a plurality of test profiles to use when testing a system under test (SUT) and a UTS adapter coupled to the UTS where the UTS adapter comprises a first interface defining an arrangement of first I/O elements and where each of the first I/O elements is assigned to a respective one of a plurality of different I/O data communication techniques. The test platform includes a SUT adapter coupled to the SUT and to the UTS adapter where the SUT adapter includes a second interface defining an arrangement of second I/O elements and where each of the first I/O elements contacts a respective one of the second I/O elements when the UTS adapter and SUT adapter are coupled together. Further, the SUT adapter is coupled to the SUT via a first plurality of cables where only a sub-portion of the second I/O elements are coupled to the SUT via the first plurality of cables and only the sub-portion of the second I/O elements are used when testing the SUT using the selected test profile.

Another embodiment described herein is a method that includes selecting one of a plurality of test profiles to use for testing a SUT using a UTS. The method also includes coupling a UTS adapter to a SUT adapter where the UTS adapter is coupled to the UTS via a first plurality of cables and the SUT adapter is coupled the SUT via a second plurality of cables. Further, the UTS adapter includes a first interface defining an arrangement of first I/O elements where each of the first I/O elements is assigned to a respective one of a plurality of different I/O data communication techniques. The SUT adapter includes a second interface defining an arrangement of second I/O elements where each of the first I/O elements contacts a respective one of the second I/O elements when the UTS adapter and SUT adapter are coupled together. Moreover, only a sub-portion of the second I/O elements are coupled to the SUT via the second plurality of cables and only the sub-portion of the second I/O elements are used when testing the SUT using the selected test profile.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe a universal test platform that includes a universal test station (UTS) coupled to a system under test (SUT) using common adapters. The common adapters each includes an interface subdivided into portions that are assigned to different data and power standards—e.g., Ethernet, USB, InfiniBand, optical signals, 120V DC power, 220V DC power, etc. Both the UTS and the SUT can be coupled to respective common adapters. In one embodiment, the UTS is coupled to a first common adapter (referred to herein as the UTS adapter) using a plurality of cables that transmits the different data and power signals between the UTS and the UTS adapter. For example, the interface in the UTS adapter may include a plurality of pins or optical channels that are each coupled to one of the plurality of cables.

In contrast, the common adapter coupled to the SUT (referred to herein as the SUT adapter) may not have a corresponding cable for each of the I/O elements in the interface. That is, only a portion of the I/O elements in the interface of the SUT adapter are coupled to respective cables coupling the SUT adapter to the SUT. For example, although the interface has I/O elements assigned for Ethernet, USB, InfiniBand, and optical signals, the SUT may have only Ethernet and USB ports. Thus, the SUT is coupled only to USB and Ethernet I/O elements in the interface of the SUT adapter but not to the InfiniBand or optical I/O elements. Different types of SUTs may have different I/O ports, and thus, be coupled differently to the SUT adapters.

When the SUT adapter is coupled to the UTS adapter, data and power signals flow only through a portion of the interface. That is, the I/O elements that are not coupled via a cable to the SUT are unused. Once the adapters are coupled, a testing profile can be selected which instructs the UTS to execute a test on the SUT. Once the test is finished, the SUT adapter can be disconnected and a new SUT can be connected to the UTS adapter even if the new SUT has cables coupled to different I/O elements in the SUT adapter. Because the interface of the SUT adapter is universal or generic, different types of SUTs can be connected to the same UTS using the common interface.

Figure 1:
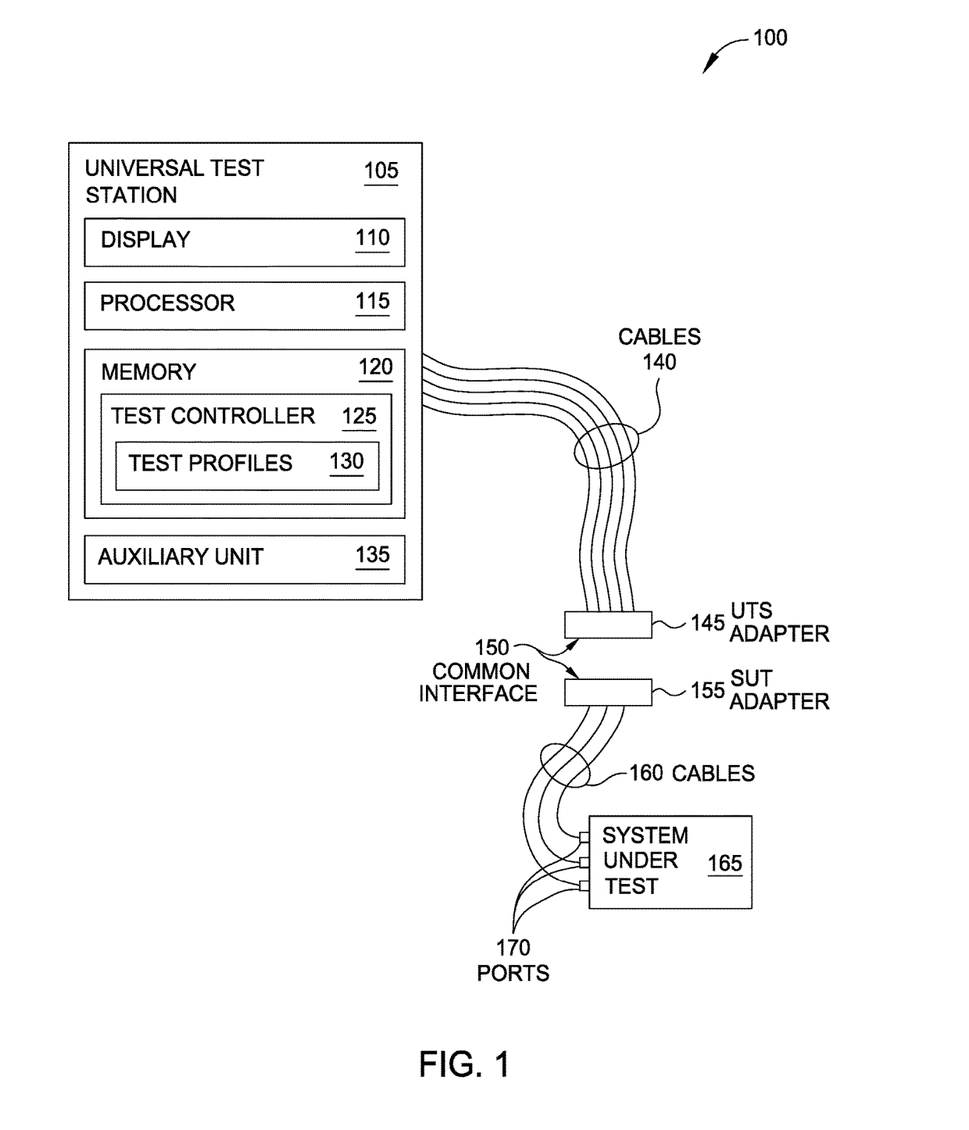
FIG. 1 is a block diagram of a universal testing platform capable of testing different electronic devices, according to one embodiment described herein.

FIG. 1 is a block diagram of a universal test platform 100 capable of testing different electronic devices, according to one embodiment described herein. The test platform 100 includes a UTS 105 coupled to UTS adapter 145 using a set of cables 140 and a SUT 165 coupled to a SUT adapter 155 using a set of cables 160. To facilitate communication between the UTS 105 and the SUT 165, the UTS adapter 145 and the SUT adapter 155 include a common (or shared) interface 150 which has a defined arrangement of I/O elements. The I/O elements may include an array of conductive pads or combinations of pins and holes. For example, the UTS adapter 145 may include pins that align to respective holes in the SUT adapter 155. The pins in the UTS adapter 145 can mate with the holes in the SUT adapter 155 to create electrical connections between the UTS 105 and the SUT 165. In one embodiment, the UTS adapter 145 and the SUT adapter 155 are formed from molded pieces of insulative material—e.g., rubber or plastic—which includes channels in which conductive wire or leads can be disposed to transmit electrical signals between the interface 150 and the cables 140 and 160.

The I/O elements in the common interface 150 are assigned to different data or power standards. For example, a first set of the I/O elements in both the UTS adapter 145 and SUT adapter 155 are assigned to transmit Ethernet data signals, a second set of the I/O elements are assigned to transmit Cat5 signals, a third set are assigned to provide 120 V DC power, and so forth. However, not every I/O element in the interface 150 must be used when testing the SUT 165. For example, while the cables 140 may include a respective cable coupled to each I/O element in the interface 150, the cables 160 may connect to only a sub portion of the I/O elements. As shown, the SUT 165 includes a set of I/O ports 170 which are coupled to one of the cables 160. While the interface 150 may include I/O elements assigned to Ethernet and USB data signals, the SUT 165 may include ports 170 that transmit only Ethernet signals. Thus, the SUT 165 may not be coupled to the I/O elements assigned to USB data signals in the SUT adapter 155.

In one embodiment, the adapters 145 and 155 include mechanical fasteners for aligning or coupling the two adapters to each other such that each I/O element in one adapter makes an electrical connection with a corresponding I/O element in the other adapter. For example, the mechanical fasteners may include one or more screws extending between the adapters or a lever system that presses the I/O elements together. Additionally, one or both of the adapters 145 and 155 may include alignment features so that the respective I/O elements are aligned when the adapters 145 and 155 are brought into contact.

The UTS 105 includes a display 110, processor 115, memory 120, and auxiliary unit 135. The display 110 can be an integrated display or a standalone monitor. The display 110 provides output to a service technician who can ensure the proper test is being executed on the SUT 165, identify any errors executing the test, and determine the appropriate action after the test is complete.

The processor 115 represents one or more processing elements that each may include one of more processing cores. The memory 120 can include volatile memory, non-volatile memory, or combinations thereof. As shown, the memory 120 stores a test controller 125 (e.g., a software application) that tests the functionality of the SUT 165. For example, the test controller may perform different types of tests on the SUT 165 such as a diagnostics test, a two corner test, or a network traffic test. However, the test may vary depending for what type of SUT 165 is currently coupled to the UTS 105. For example, a diagnostic test for a server may be different than a diagnostic test on a network switch. As such, the test controller 125 stores multiple test profiles 130 that correspond to different electronic devices that can be tested using the UTS 105. In one embodiment, a programmer generates a test profile 130 for each electronic device that may be coupled to the UTS 105. The test controller 125 can test any type of electronic device that has a test profile 130.

In one embodiment, the test profile 130 indicates the type of I/O ports 170 in the SUT 165. For example, the test profile 130 may inform the test controller 125 that the SUT 165 includes a 10 Gb/s Ethernet port, a USB 3.0 port, and a 120 V power port. Using this information, the test controller 125 can then identify the corresponding I/O elements in the interface 150 assigned to these data and power signals and use those I/O elements to test the SUT 165. Put differently, the test profile 130 informs the test controller 125 which of the I/O elements in the SUT adapter 155 are coupled to the SUT 165 and which are not.

Further, the test profile 130 may indicate the parameters of the test such as the type of test data transmitted to the SUT 165 (and the expected resulting data received from the SUT 165), the duration of the test, the rate at which data should be transmitted to the SUT 165, and the like. The test parameters can vary depending on the type of SUT 165 being tested.

In one embodiment, the test profile 130 is selected by a service technician. For example, the display 110 may output a list of electronic devices that the UTS 105 can test. The service technician can select the type of SUT 165 currently coupled to the UTS 105. Based on this selection, the test controller 125 can load the corresponding test profile 130 and test the SUT 165. In another embodiment, the test profile 130 may be selected using a bar code or other identification data that is disposed on the SUT common adapter 155 or the SUT 165. For example, the service technician may use a bar code reader to scan the bar code on the adapter 155 or the SUT 165 which instructs the test controller 125 to select one of the test profiles 130. In yet another embodiment, the test profile 130 is selected automatically without input from a human operator. As described below, RFID or some other wired or wireless communication technique may be used to inform the test controller 125 of the test profile 130 that corresponds to the SUT 165.

The embodiments herein are not limited to any particular type of SUT 165. Instead, the embodiments described below can be used on any electronic device that includes I/O ports or power ports. As non-limiting examples, the SUT 165 can be a server, switch, router, or the like.

Figure 2:
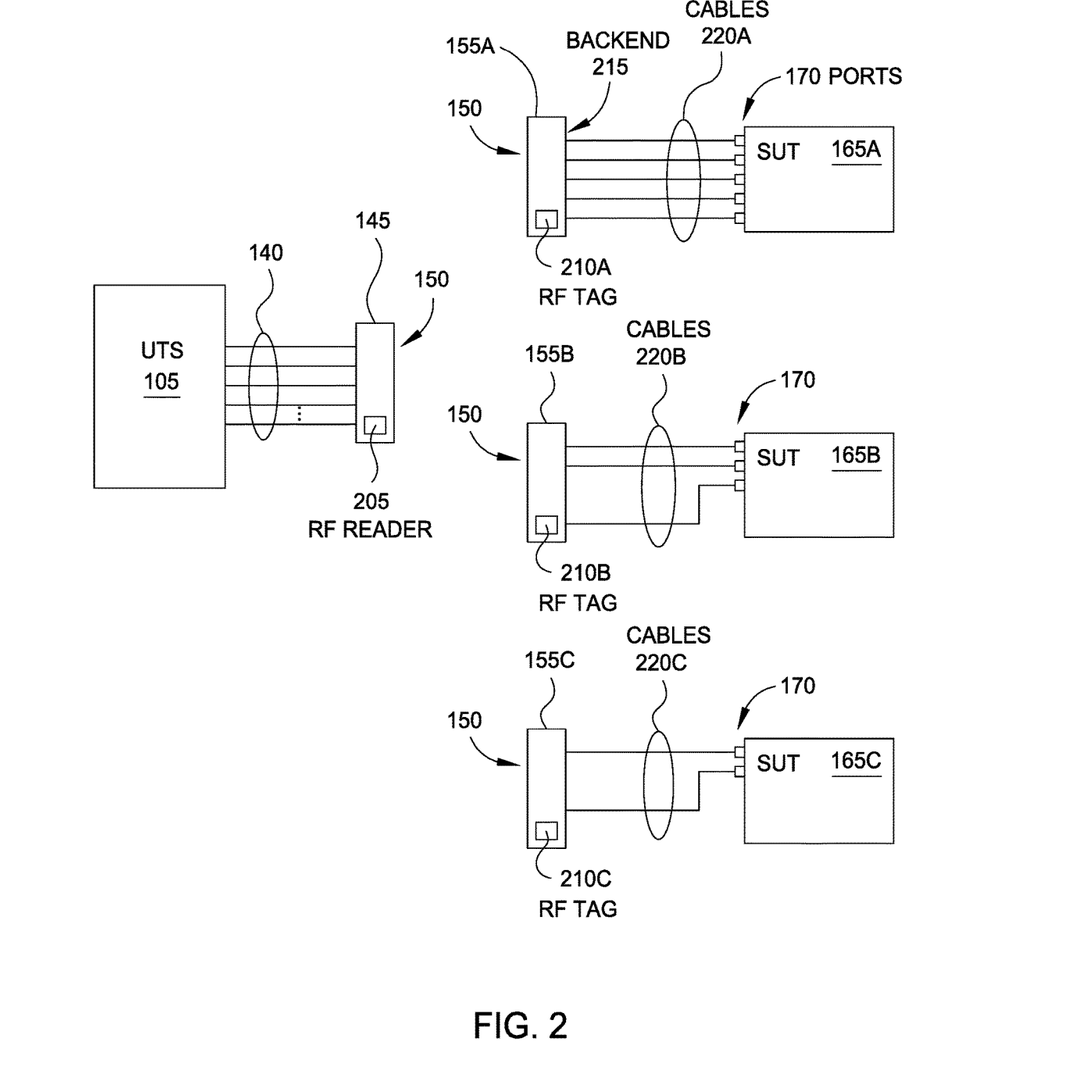
FIG. 2 illustrates testing different systems under test using the same universal test station, according to one embodiment described herein.

FIG. 2 illustrates different SUTs 165 that are tested using the same UTS 105, according to one embodiment described herein. In this example, the SUTs 165A, 165B, and 165C each represent a different electronic device which have different I/O capabilities. As a result, the manner in which a test is performed by the UTS 105, or the type of test the UTS 105 performs, varies depending on which of the SUTs 165 is coupled to the UTS 105.

Each SUT 165 is coupled to a respective SUT adapter 155. In one embodiment, the SUT adapters 155 all share a common interface 150 with the UTS adapter 145 which means the I/O elements in both of the adapters 145 and 155 share the same arrangement. However, this is not a requirement. For example, the SUT adapters 155 may have different interfaces that the interface 150 of the UTS adapter 145 which have only a sub-portion of the I/O elements in the interface 150. For example, if the SUT 165A has Ethernet ports and USB ports but not InfiniBand ports, then the SUT adapter 155A may not include I/O elements only for Ethernet and USB but not InfiniBand. That is, each type of SUT 165 may correspond to a unique type of SUT adapter which contains a sub portion of the I/O elements in the interface 150 of the UTS adapter. However, one advantage of using a SUT adapter 155 that has the same interface 150 as the UTS adapter 145 is that the SUT adapters 155 in FIG. 2 can be coupled to any of the different types of SUTs 165 rather than requiring a different adapter for each type of SUT 165.

Although in FIG. 2 the interfaces 150 on all the SUT adapters 155 are the same, the manner in which a backend 215 of the adapters is coupled to the SUTs 165 is not. For example, SUT 165A includes four I/O ports 170 which are coupled to four cables 220A. In turn, these cables 220A are coupled to at least four of the respective I/O elements in the interface 150 of the SUT adapter 155A. In contrast, SUT 165B includes three I/O ports 170 which are coupled to three cables 220A and at least three of the I/O elements in the interface 150 of SUT adapter 155B. These three I/O elements may include some or none of the four I/O elements to which the SUT 165A is connected to in SUT adapter 155A. The SUT 165C has only two I/O ports 170 which are coupled to at least two I/O elements in the SUT adapter 155C using cables 220C. These two I/O elements can be the same as, or different from, the I/O elements connected to the SUTs 165A and 165B.

Although the connections of the SUTs 165 to the respective backends 215 of the SUT adapters 155 are all different, the UTS 105 can test and verify the functionality of each of the SUTs 165A-C. That is, because the SUTs 165 are coupled to SUT adapters 155 that can couple to the UTS adapter 145, the SUTs 165 can be interchangeably coupled to the UTS adapter 145 and tested by the UTS 105 using the different test profiles described above. In one embodiment, the UTS adapter 145 and the SUT adapter 155 replace any standardized or specific connectors used by the I/O data and power techniques implemented by the SUTs 165. For example, assume that one of the ports 170 in the SUT 165A is a Cat5e port that couples to a RJ-45 connector of a Cat5e cable. Instead of using the RJ-45 connector to connect the SUT 165 to the UTS 105, the Cat5e cable is instead coupled to the backend 215 of SUT adapter 155A. This connection to the backend 215 may be done using a RJ-45 connector or use a direct wire bond which may save space. For example, the Cat5e cable used to transmit the signals to the SUT adapter 155A can have one of its RJ-45 connectors stripped off so the wires in the cable can be directly coupled to pads or leads in the backend 215.

To transmit the data signals to the UTS 105, the data signals provided by the Cat5e port are routed from the backend 215 of the SUT adapter 155A to a corresponding I/O element or elements in the interface 150. When mated with the UTS adapter 145, the corresponding I/O element or elements in the adapter 145 receive the data signals and the cables 140 transmit those signal to the UTS 105 for testing. Thus, the UTS adapter 145 and the SUT adapters 155 permit the test platform to use a generic interface 150 to transmit data and power signals rather than relying on the standardized connections of the different I/O techniques—e.g., Ethernet, InfiniBand, USB, etc.

The interface 150 can also transmit power using a universal arrangement of pins. For example, the backend 215 may include ports for accepting power cables that may have earth ground, support multiple phase power, and have different prong shapes that vary depending on the country the SUT 165 will be sold. Regardless of the number or arrangement of the prongs, the backend 215 can be formed to accept any of these arrangements and couple the prongs to respective I/O elements in the interface 150. In another embodiment, rather than the SUT adapter 155 accepting the different prong configurations, a technician can strip a connector off a power cord coupled to the SUT 165 and directly connect the wires in the power cord to conductive leads in the backend 215 which are in turn coupled to I/O elements in the interface 150.

In FIG. 2, the UTS adapter 145 includes a RF reader 205 while the SUT adapters 155 include RF tags 210. In one embodiment, the UTS adapter 145 powers the RF reader 205 using one of the cables 140. When a wireless signal emitted by the RF reader 205 is received by one of the RF tags 210, the tag 210 transmits a wireless return signal to the RF reader 205 that includes an ID that identifies the SUT 165. Using this ID, the test controller in the UTS 105 can select a specific test profile for testing the SUT 165. In one embodiment, the transmission power of the RF reader 205 is set such that a radiation pattern RF reader 205 only reaches the tags 210 when the SUT adapter 155 is coupled to the UTS adapter 145. Thus, whenever a new SUT adapter 155 is coupled to the UTS adapter 145, the RF reader 205 can detect the tag and the ID corresponding to the SUT 165. In one embodiment, the RF tags 210 are passive tags that do not require a power source. In other embodiments, the RF tags 210 are active tags which include their own power source (e.g., a battery in the adapter 155) for transmitting signals to the RF reader 205.

When coupling a SUT adapter 155 to a SUT 165, a technician may program the RF tag 210A to transmit the ID of the SUT 165. That is, the technician may program the RF tag 210A to transmit a different ID depending on which type of SUT 165A, 165B, or 165C is coupled to the SUT adapter 155A. Thus, once the SUT adapter 155A is coupled to the UTS adapter 145, the RF reader 205 can identify and transmit the ID to the UTS 105 to select the correct test profile. In one embodiment, the SUT adapters 155 may include a slot for holding the RF tags 210. Depending on which SUT 165 is coupled to the SUT adapter 155, the technician can insert the RF tag 210 with an ID corresponding to the SUT 165 into the slot of the SUT adapter 155. In this manner, the RF tags 210 can be matched with the appropriate SUTs 165 so that the UTS 105 can automatically select the appropriate test profile for the SUT 165 without human intervention once the SUT adapter 155 is within close proximity of the RF reader 205.

Figure 3:
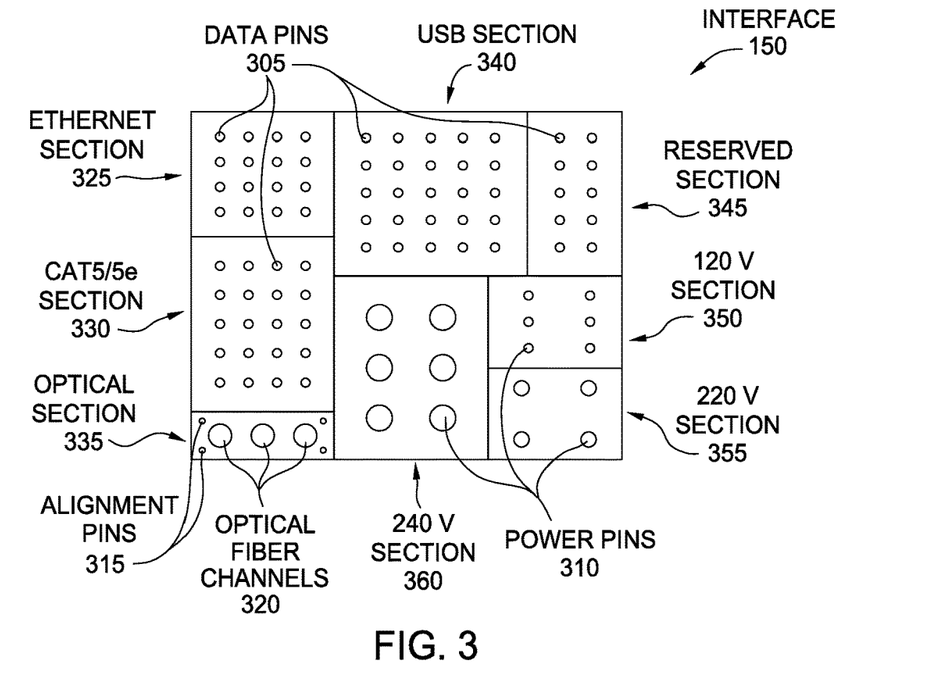
FIG. 3 illustrates the interface for a common adapter used to couple the universal test station to a system under test, according to one embodiment described herein.

FIG. 3 illustrates the interface 150 for a common adapter used to couple the UTS to a SUT, according to one embodiment described herein. The interface 150 defines a predefined arrangement of I/O elements on the UTS and SUT adapters. As shown, the interface 150 includes a variety of different I/O elements—i.e., data pins 305, power pins 310, and optical fiber channels 320. As mentioned above, the UTS and SUT adapters may have the same interface 150 in one embodiment—i.e., the arrangement of the I/O elements is the same—although the types of the I/O elements may be different. For example, the UTS adapter may have data pins 305 while the SUT adapters have corresponding pin holes at the same locations on the interface 150 for receiving the data pins 305.

The interface 150 is divided into different sections which indicate the function assigned to the I/O elements in those sections. Specifically, the interface 150 includes an Ethernet section 325, USB section 340, reserved section 345, 120V section 350, 220V section 355, 240V section 360, optical section 335, and Cat5/5e section 330. Each section includes at least one I/O element assigned to carry a data signal or power signal that corresponds to the section type. For example, the data pins 305 in the Ethernet section 325 are assigned to carry data signals that are compatible with the Ethernet communication standard, the data pins 305 in the USB section 340 are compatible with at least on USB standard, and the like. However, the data pins 305 in the reserved section 345 are not assigned to any specific communication standard but can be used as an overflow (if a particular section does not have enough I/O elements for a particular SUT) or if a new communication standard is invented which means the same adapters can be used—i.e., new adapters do not need to be manufactured.

The optical section 335 includes optical fiber channels 320 which may be the ends of respective optical fibers embedded in the adapter. For example, the optical fiber channels 320 may be the ends of optical fibers that extend from the UTS adapter to the UTS or from the SUT adapter to the SUT. When an SUT adapter is coupled to the UTS adapter, the respective optical channels 320 are aligned such that optical signals can be transmitted between the SUT and UTS. To aid with the alignment, the interface 150 includes alignment pins 315 which can mate with corresponding alignment holes in the SUT adapter to align the optical channels 320 in the UTS adapter to the optical channels 320 in the SUT adapter. In one embodiment, the alignment pins 315 are not used to transmit any type of electrical data signal, but rather to ensure sufficient optical alignment between the optical sections of the respective adapters. Additionally, the SUT and UTS adapters may include a lens or a system of lenses for improving the transfer of the optical signals between the adapters.

The power pins 310 (e.g., power connectors) in the 120V, 220V, and 240V sections 350, 355, and 360 have different sizes to facilitate efficient power transfer between the UTS and the SUT. For example, larger size power pins 310 may be preferred for power pins that carry larger amounts of current to prevent overheating. By increasing the size of the power pins 310, the resistance of the connection between the SUT and UTS adapters may be decreased, thereby reducing the chance the adapters may overheat.

Although the interface 150 has different I/O elements so that all different I/O communication techniques can be supported by a single, unitary adapter, in other embodiments, the universal test platform may include multiple adapters that each have different interfaces. For example, instead of using one UTS and SUT adapter pair, the platform may include multiple UTS and SUT adapter pairs where one pair has a common interface for transmitting data signals (e.g., Ethernet, USB, Cat5/5e, etc), a second pair has a common interface for power signals (e.g., 120V, 220V, 240V, etc), and a third pair has a common interface for transferring optical signals. In this example, the UTS and SUT would be coupled to three different adapters which would connect to their counterparts that have the same interface for testing.

Figure 4:
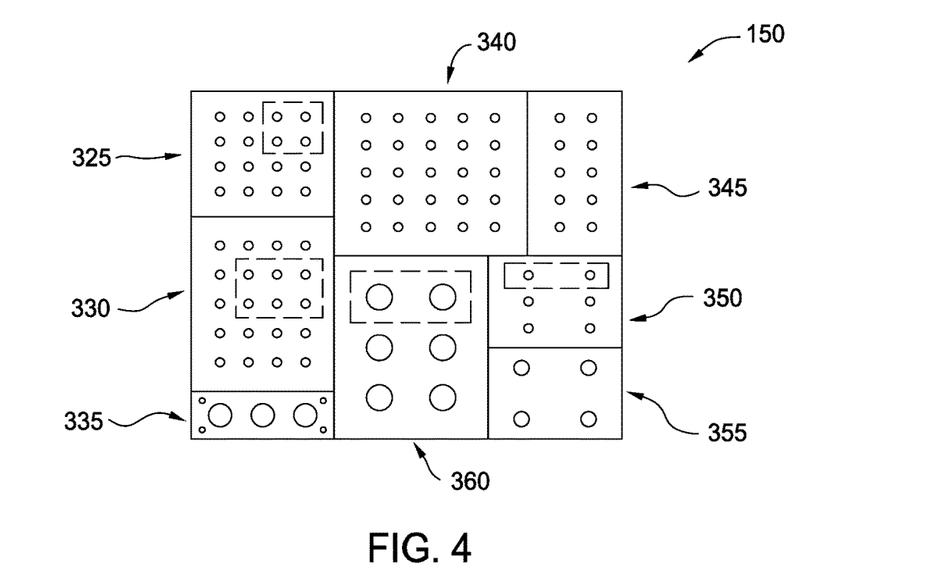
FIG. 4 illustrates a portion of the interface for the common adapter that is active during a test, according to one embodiment described herein.

FIG. 4 illustrates a portion of the interface 150 for the common adapter that is active during a test, according to one embodiment described herein. That is, FIG. 4 illustrates only a portion of the I/O elements in the interface 150 being used to test a SUT. As described above, although the UTS and SUT adapters may have the same interface 150, only a portion of the I/O elements in the interface for the UTS and SUT adapters are used to test the SUT. To illustrate this, only the I/O elements contained with the dotted boxes are used to test the SUT while the remaining I/O elements are unused. In one embodiment, only the I/O elements in the dotted box are coupled to a respective cable or cables at the backend of the SUT adapter which couples these I/O elements to the SUT. The remaining I/O elements may not be coupled to any cables at the backend of the SUT adapter.

As shown, four data pins in the Ethernet section 325 and six data pins in the Cat5/5e section 330 are used to transmit data signals between the UTS and the SUT during the test. Moreover, two power pins in the 240V section 360 and two power pins in the 120V section 350 are used during the test. For example, the SUT may include two different voltage supplies which are separately tested using the 240V and 120V sections 350 and 360.

In one embodiment, the data pins within a particular section may be further subdivided according to data speeds. For example, the SUT may have a 10 Gb/s Ethernet port which corresponds to the four data pins in the Ethernet section 325 shown in the dotted box. However, if the SUT had a 2 Gb/s Ethernet port, the SUT may be coupled to different data pins within the Ethernet section 325.

Figure 5:
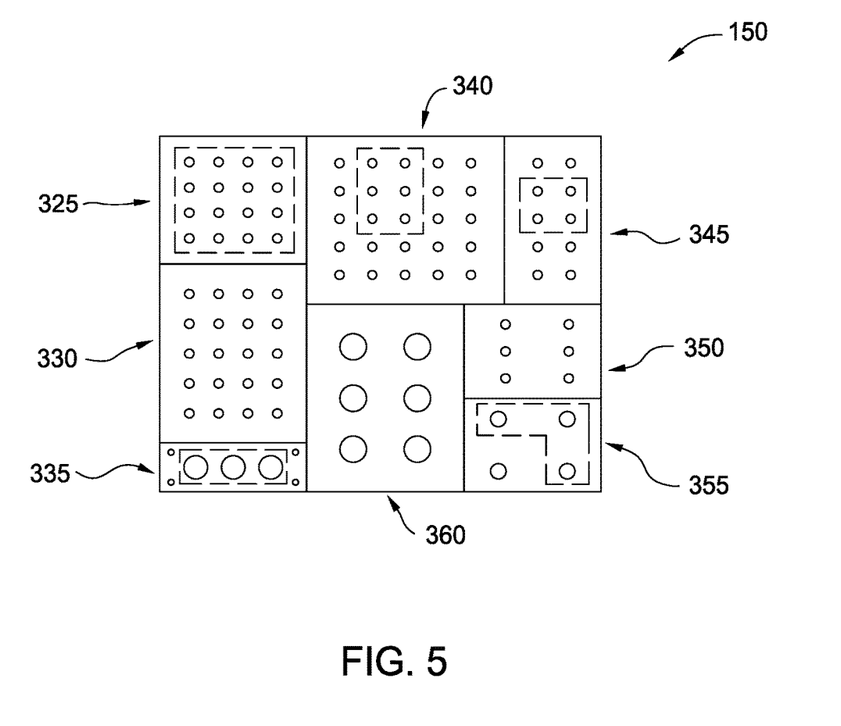
FIG. 5 illustrates a portion of the interface for the common adapter that is active during a test, according to one embodiment described herein.

FIG. 5 illustrates a portion of the interface for the common adapter that is active during a test, according to one embodiment described herein. Like FIG. 4, FIG. 5 illustrates only a portion of the I/O elements in the interface 150 being used to test a SUT. In this example, all of the data pins in the Ethernet section 325 are used to test the SUT. For instance, the SUT may have ports with different Ethernet speeds which require the use of all the data pins designated in the Ethernet section 325. Moreover, the configuration shown in FIG. 5 also uses data pins in the reserved section 345. For example, the Ethernet section may not have enough pins to test all the Ethernet ports in the SUT, or the SUT may use a unique I/O technique that does not have assigned data pins in the interface 150.

Unlike in FIG. 4, the test configuration in FIG. 5 uses the optical channels in the optical section 335 to transmit data signals. Thus, this configuration transfers both electrical signals and optical signal between the UTS and SUT.

Although FIGS. 4 and 5 both illustrate using at least one of the power ports, in other embodiments, the power section may not be used. For example, the SUT may be plugged into a separate outlet. Thus, the universal test platform could test the SUT by transferring only data signals, only optical signals, or both using the interface 150.

Figure 6:
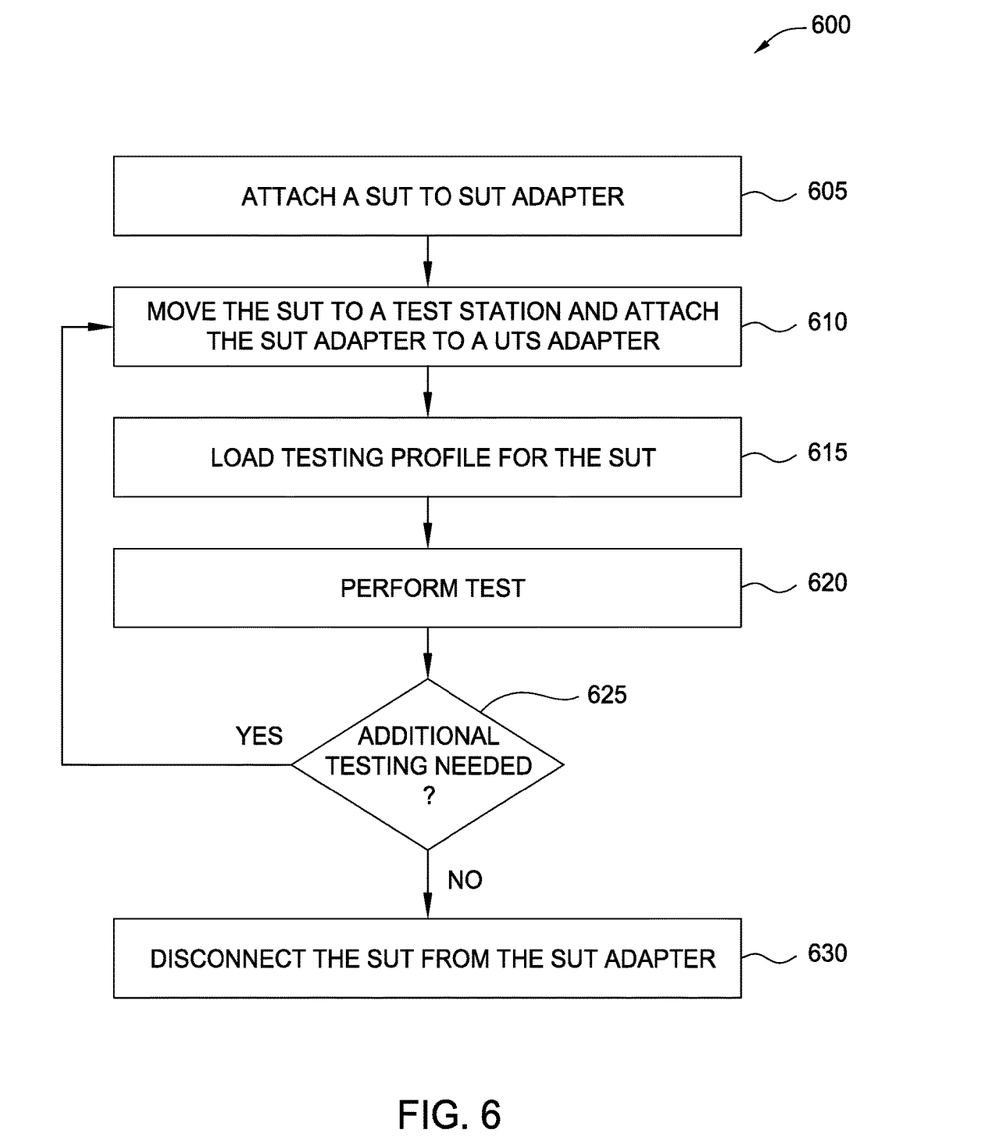
FIG. 6 is a flowchart for operating a universal test platform, according to one embodiment described herein.

FIG. 6 is a flowchart of a method 600 for operating the universal test platform, according to one embodiment described herein. At block 605 a technician attaches a SUT to a SUT adapter. In one embodiment, the technician plugs in or couples a first end of one or more cables to ports in the SUT. The ports may be I/O ports for electrical or optical signals or power ports. The technician couples the second end of the cables to a backend of the SUT adapter. For example, the backend may include a plurality of ports similar to the ports on the SUT. The ports on the backend may be the standardized ports or connectors for the various I/O communication techniques (e.g., Ethernet, USB, Infini-Band, etc.). In another embodiment, the backend may include leads to which the conductive wires in the cables are connected. Put differently, instead of using standardized connectors, the second ends of the cables can be striped to expose one or more conductive wires in the cables. These wires can be directly connected to respective leads in the backend of the SUT adapter. For example, the wires may be soldered or twisted onto the leads.

In one embodiment, the technician may program an RFID tag embedded in the SUT adapter or insert a RFID tag into the adapter which emits an ID corresponding to the attached SUT. As described above, the UTS adapter may include a RFID reader which can identify the RFID tag when the SUT adapter is coupled to the UTS adapter.

At block 610, the technician moves the SUT to a test station and attaches the SUT adapter to a UTS adapter. In one embodiment, attaching the SUT to the SUT adapter at block 605 can occur in a different location so that the test station can be used to perform a different test. After the SUT is coupled to the SUT adapter, at block 610, the technician moves the SUT to the test station. Because the SUT is already coupled to the SUT adapter, the technician does not need to couple a lot of individual wires and cables between the SUT and the UTS. Instead, the technician only needs to couple the SUT adapter to the UTS adapter. Of course, as described above, multiple pairs of adapters could be used—e.g., one pair of SUT/UTS adapters for a power interface and a second pair of SUT/UTS adapters for a data interface.

At block 615, the test controller in the UTS loads a test profile for the SUT. This could be done automatically using, for example, an ID provided by an RF tag and tag reader. Alternatively, the technician could select the test profile using a display and I/O device on the UTS. Or the technician could use a bar code reader on the UTS to scan a bar code on the SUT which identifies the appropriate test profile. Thus, the UTS is a universal test station since the UTS includes a generic adapter that can couple to different types or numbers of I/O and power ports as well as storing different test profiles that define how to test each individual SUT that may be coupled to the UTS.

At block 620, the technician determines if additional testing is needed. For example, a SUT may have to pass multiple tests before being shipped to a customer. While a single UTS could be configured to perform all the tests, in one embodiment, a manufacturer may have multiple UTSs. For example, the manufacture may have one group of UTSs configured to perform a one-hour diagnostic test for the SUTs, a second group configured to perform a twelve-hour diagnostic test, and a third group configured to perform a network traffic test. The different groups of UTSs may have specialized auxiliary units to perform their respective tests. For example, the third group of UTSs may include a network traffic generator for performing the network traffic test. Because the UTS are universal, they can perform their respective tests on a plurality of different SUTs using the test profiles. That is, even though a UTS may perform only a single type of test, the type of data transmitted during the test, the speeds at which the data is transmitted, the duration of the test, etc. may vary depending on which SUT is currently being tested.

If the SUT should be moved to a different test station for another test, method 600 returns to block 610. Otherwise, method 600 proceeds to block 630 where the technician disconnects the SUT from the SUT adapter. Because the SUT adapter may be generic, the technician can couple the SUT adapter to another SUT even if that SUT is a different type than the SUT previously coupled to the adapter. As described above, the new SUT may be coupled to the backend of the SUT adapter using a different cable configuration than the previous SUT. Method 600 could then repeat.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A test platform, comprising:
 a universal test station (UTS) comprising a test controller configured to select one of a plurality of test profiles to use when testing a system under test (SUT);
 a UTS adapter coupled to the UTS, wherein the UTS adapter comprises a first interface defining an arrangement of first I/O elements, wherein each of the first I/O elements is assigned to a respective one of a plurality of different I/O data communication techniques; and
 a SUT adapter coupled to the SUT and to the UTS adapter, wherein the SUT adapter comprises a second interface defining an arrangement of second I/O elements, wherein each of the first I/O elements contacts a respective one of the second I/O elements when the UTS adapter and SUT adapter are coupled together,
 wherein the SUT adapter is coupled to the SUT via a first plurality of cables, wherein only a sub-portion of the second I/O elements are coupled to the SUT via the first plurality of cables and only the sub-portion of the second I/O elements are used when testing the SUT using the selected test profile.

2. The test platform of claim 1, further comprising:
 a second plurality of cables coupling the UTS adapter to the UTS, wherein each of the first I/O elements in the UTS adapter is coupled to UTS via at least one of the second plurality of cables.

3. The test platform of claim 1, wherein only a sub-portion of the first I/O elements that are coupled to the sub-portion of the second I/O elements are used when testing the SUT.

4. The test platform of claim 1, wherein the first interface and second interface each define an arrangement of power connectors, wherein the power connectors are assigned to different voltage ranges, wherein each of the power connectors in the first interface aligns to a respective one of the power connectors in the second interface, and wherein only a sub-portion of the power connectors are used when testing the SUT.

5. The test platform of claim 4, wherein all of the power connectors in the first interface are coupled to the UTS, wherein only the sub-portion of the power connectors in the second interface is coupled to the SUT.

6. The test platform of claim 1, wherein the first interface and second interface each define an arrangement of optical channels, wherein each of the optical channels in the first interface aligns to a respective one of the optical channels in the second interface, and wherein only a sub-portion of the optical channels are used when testing the SUT.

7. The test platform of claim 1, wherein the first interface is divided into a plurality of sections each comprising a plurality of the first I/O elements, wherein each of the plurality of sections is assigned to only one of the plurality of different I/O data communication techniques.

8. The test platform of claim 7, wherein a first one of the plurality of the first I/O elements in a first one of the plurality of sections is used when testing the SUT, and a first one of the plurality of the first I/O elements in a second one of the plurality of sections is used when testing the SUT.

9. The test platform of claim 8, wherein a second one of the plurality of the first I/O elements in the first one of the plurality of sections is not used when testing the SUT and a second one of the plurality of the first I/O elements in the second one of the plurality of sections is not used when testing the SUT.

10. The test platform of claim 1, wherein each of the plurality of test profiles corresponds to a different type of SUT, wherein the test controller changes a test parameter depending on which of the plurality of test profiles is selected for testing the SUT.

11. A method, comprising:
selecting one of a plurality of test profiles to use for testing a system under test (SUT) using a universal test station (UTS); and
coupling a UTS adapter to a SUT adapter, wherein the UTS adapter is coupled to the UTS via a first plurality of cables and the SUT adapter is coupled the SUT via a second plurality of cables,
wherein the UTS adapter comprises a first interface defining an arrangement of first I/O elements, wherein each of the first I/O elements is assigned to a respective one of a plurality of different I/O data communication techniques,
wherein the SUT adapter comprises a second interface defining an arrangement of second I/O elements, wherein each of the first I/O elements contacts a respective one of the second I/O elements when the UTS adapter and SUT adapter are coupled together, and
wherein only a sub-portion of the second I/O elements are coupled to the SUT via the second plurality of cables and only the sub-portion of the second I/O elements are used when testing the SUT using the selected test profile.

12. The method of claim 11, wherein each of the first I/O elements in the UTS adapter is coupled to UTS via at least one of the first plurality of cables.

13. The method of claim 11, further comprising:
testing the SUT using the UTS using only a sub-portion of the first I/O elements, wherein the sub-portion of the first I/O elements are coupled to the sub-portion of the second I/O elements are used when testing the SUT.

14. The method of claim 11, wherein the first interface and second interface each define an arrangement of power connectors, wherein the power connectors are assigned to different voltage ranges, wherein each of the power connectors in the first interface aligns to a respective one of the power connectors in the second interface, and wherein only a sub-portion of the power connectors are used when testing the SUT.

15. The method of claim 14, wherein all of the power connectors in the first interface are coupled to the UTS, wherein only the sub-portion of the power connectors in the second interface is coupled to the SUT.

16. The method of claim 11, wherein the first interface and second interface each define an arrangement of optical channels, wherein each of the optical channels in the first interface aligns to a respective one of the optical channels in the second interface, and wherein only a sub-portion of the optical channels are used when testing the SUT.

17. The method of claim 11, wherein the first interface is divided into a plurality of sections each comprising a plurality of the first I/O elements, wherein each of the plurality of sections is assigned to only one of the plurality of different I/O data communication techniques.

18. The method of claim 17, wherein a first one of the plurality of the first I/O elements in a first one of the plurality of sections is used when testing the SUT, and a first one of the plurality of the first I/O elements in a second one of the plurality of sections is used when testing the SUT.

19. The method of claim 18, wherein a second one of the plurality of the first I/O elements in the first one of the plurality of sections is not used when testing the SUT and a second one of the plurality of the first I/O elements in the second one of the plurality of sections is not used when testing the SUT.

20. The method of claim 11, wherein each of the plurality of test profiles corresponds to a different type of SUT, the method further comprising:
changing a test parameter depending on which of the plurality of test profiles is selected for testing the SUT.

* * * * *